April 14, 1964
R. M. SALEMKA
3,128,602
THRUST VECTOR CONTROL
Filed Dec. 30, 1960
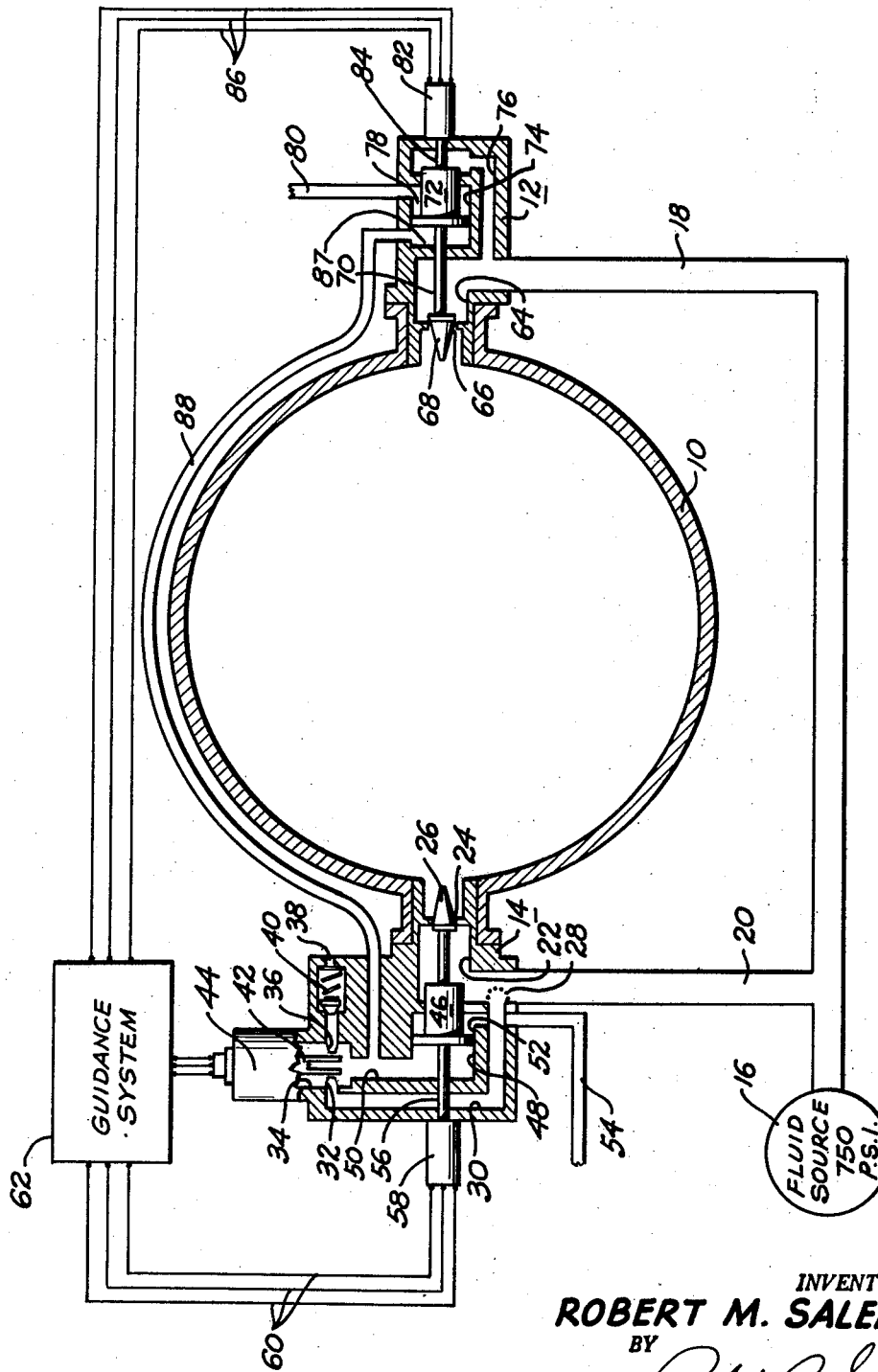
INVENTOR.
ROBERT M. SALEMKA
BY
ATTORNEY.

United States Patent Office 3,128,602
Patented Apr. 14, 1964

3,128,602
THRUST VECTOR CONTROL
Robert M. Salemka, South Bend, Ind., assignor to The Bendix Corporation, South Bend, Ind., a corporation of Delaware
Filed Dec. 30, 1960, Ser. No. 79,770
11 Claims. (Cl. 60—35.54)

This invention relates to an electro-mechanical control system and more particularly to a servo system in which a plurality of control valves are controlled through the action of a single electro-responsive element.

In attempting to control the direction or attitude of a missile one technique which has been given a considerable amount of study is that of injecting a fluid directly into a nozzle perpendicular to the main flow of gases to thereby change the thrust vector of said main flow. This presents the problem of coordinating the closing and opening of a plurality of injection nozzles which may be spaced across from the main nozzle and at some distance from each other. In order to save weight it has been usual to provide an electromechanical transducer at each nozzle and to provide the intelligence to the individual transducers through wires extending from a guidance system. Even such transducers have significant size and weight and it is desirable to eliminate them so far as possible. Furthermore, the elimination of a component eliminates the reliability problems associated therewith. It is, therefore, an object of the present invention to provide a servo system in which a plurality of servo pistons are controlled through the operation of a single electro-mechanical transducer.

It is another object of the present invention to provide a servo system which accomplishes the above object and in which means are provided for assuring that, in a two valve system wherein said valves are actuated by servo pistons, when one valve is open the other is closed.

It is another object to provide a servo system which is very small and light and is simple and straightforward in structure.

It is a further object of the present invention to provide a servo system which accomplishes the above objects and is inherently highly reliable.

Other objects and advantages will become apparent from the following specification and drawing in which:

The single figure is a sectional view transversely through a main rocket nozzle chamber showing, also in section, a pair of injector nozzles and the electro-mechanical control system for controlling said injection nozzles.

Referring now to the drawing, the cross section of the main rocket nozzle is shown at numeral 10 having attached thereto an injector nozzle unit 12 and a second injector nozzle unit 14. In this system a fluid capable of producing a substantial shock wave upon vaporization is supplied from a source 16 under high pressure to nozzle unit 12 through a conduit 18 and to nozzle unit 14 through a conduit 20. For other applications other fluids such as hydraulic oil may be used. Within nozzle unit 20 the actuating fluid flows into a chamber 22 and across an orifice 24 which has its effective area controlled by means of a valve member 26. Some of the fluid also flows across a small filter 28 into a conduit 30 where it communicates with an orifice 32, which communicates with a controlled pressure chamber 34. Directly across chamber 34 from orifice 32 is a second orifice 36 which leads to an overboard vent 38 the flow through which is controlled by means of a small spring loaded valve 40. Flow through orifices 32 and 36 is controlled by means of a control valve member 42 forming part of a torque motor assembly 44.

Valve member 26 is positioned axially by means of a differential area piston 46 which reciprocates in a cylinder 48 communicating with the controlled pressure chamber 34 through a conduit 50. The chamber 52 on the back side of the large diameter portion of the piston 46 is in communication with atmosphere or some other low pressure source through a conduit 54. Also attached to piston 48 by means of a shaft 56 is a position feedback unit 58 which might typically contain a potentiometer which provides a voltage output varying with the effective axial position of the valve member 26. This output voltage is supplied through wires 60 as a position feedback signal to a guidance system 62. It is, of course, the function of the guidance system 62 to supply the intelligence to the torque motor unit 44 in order to control the attitude of the associated missile. The details of the guidance system 62 and its associated input signals are not a part of the present invention and have not been described in detail herein.

Actuating fluid supplied to the nozzle unit 12 through conduit 18 is supplied to a chamber 64 immediately upstream from an orifice 66 the flow through which is controlled by a valve member 68. Valve 68 is connected by means of a shaft 70 to a differential area piston 72 reciprocable in a cylinder 74. Fluid at the supply pressure is communicated with the small diameter end of piston 72 through a conduit 76 which communicates with conduit 18. A chamber 78 on the back side of the large diameter portion of piston 72 communicates with atmosphere or some other low pressure source through a conduit 80. The piston 72 is also connected to a travel pickup unit 82 by means of a shaft 84 and this travel pickup is, or may be, substantially identical to pick-up 58. A position feedback voltage is supplied from the pick-up 82 through wires 86 to the guidance system 62. A chamber 87 is adjacent the large area end of piston 72 in communication with chamber 34 by means of a conduit 88.

The system is designed to operate at null with the control pressure, i.e., the pressure in chamber 34 acting against the large diameter ends of pistons 48 and 72, at approximately half the pressure level of the actuating fluid supply shown herein as 750 p.s.i. Under these conditions there is no input from the guidance system to the torque motor 44 and the torque motor valve 42 is held in a centered position between orifices 32 and 36 thereby permitting flow from orifice 32 into chamber 34 and this flow will permit the pressure in chamber 34 to increase to approximately half of the supply pressure, in this case about 375 p.s.i. The supply pressure is maintained against the small diameter ends of pistons 46 and 72 at all times and, during null conditions the relative effective areas of the pistons are chosen such that the control pressure acting against the large diameter side of piston 46 is sufficient to hold valve 26 on its seat and the control pressure acting against the large diameter side of piston 72 is insufficient to cause piston 72 to move valve member 68 off its seat. Assume now that the guidance system supplies to the torque motor a signal asking for flow from the injector valve 68. The torque motor will cause the control valve 42 to be moved toward the right against the orifice 36, thereby permitting flow from orifice 32 into the control chamber 34 and thereby increasing the control pressure in this chamber as well as that acting against the large diameter ends of the pistons 46 and 72. An increase in the pressure acting against piston 46 simply results in causing valve member 26 to be pressed even more firmly on its seat; however, at some value of said increased pressure the total pressure acting against a large diameter end of piston 72 will be sufficient to overcome the force acting on the small diameter end and the valve 68 will be withdrawn from its orifice 66 and fluid will be injected into the interior of the rocket nozzle chamber 10. The relative effective areas of the small and large diameter ends of piston 72 can, of course, be proportioned to meet the requirements of any particular application. A typical proportion might be such that the valve 68 would begin to open when the control pressure supplied through conduit 88 to the large diameter end of piston 72 had increased to approximately 60% of the value of the supply pressure. As valve 68 moves in an opening direction, it also supplies a position input to the position feedback unit 82 and this unit supplies a voltage to the guidance system 62 thereby appraising the guidance system of the instantaneous axial position of the valve member 68. Should the guidance system require that the injector valve 26 be opened, the torque motor 44 will receive a signal moving the control valve 42 away from orifice 36 and toward the orifice 32. This will cause a substantial reduction in a control pressure and as soon as the control pressure is reduced below 60% of the value for the supply pressure, the piston 72 will move toward the left and thereby closing valve 68. As the control pressure drops further in value by virtue of the flow of fluid through orifice 36 it will ultimately reach a value, below the null pressure value, at which the pressure acting upon the small diameter end of piston 46 exceeds the pressure acting on the large diameter end and piston 46 will be moved toward the left thereby pulling valve member 26 toward the left thereby permitting fluid to flow through orifice 24 and into the interior of nozzle chamber 10. As piston 46 moves toward the left it also transmits a signal through shaft 56 to the position feedback pick-up 58 and this position signal is supplied to the guidance system 62. Should there be a failure in the electrical system supplying the intelligence to the torque motor 44, valve 42 will be centered and the control pressure will return to 50 percent of the supply pressure value which value is designed to always move both injector valves closed with the difference in pressure levels across the pistons being sufficient to generate a force to close greater than the most extreme friction condition of the valves which is likely to be encountered. With the control pressures acting on the individual actuating pistons interlocked through conduit 88, as shown, it will be seen that the two injector valves cannot both be open at once, yet they act jointly to move the thrust vector in essentially continuous fashion. Note that the two injector operating control pressure levels are fixed fractions of the supply pressure so that supply pressure variations will not effect this relationship.

While only one embodiment has been shown and described herein modifications will occur to those skilled in the art. For instance, it is entirely possible for more than one valve to be operated on a sequencing basis with pressure differentials on each side of the null value; however, in such a case it will be recognized that when the second valve is opened at a pressure below the null pressure value, the first such valve will remain open; as the third is opened, the first and second will remain open and similarly for the valves responsive to pressures above the null pressure value. Other modifications will occur to those skilled in the art without departing from the spirit and scope of the invention.

I claim:

1. In a servo system the combination comprising a source of fluid under pressure, a first valve assembly including an orifice communicating with said source, a valve member for controlling the flow through said orifice, and a differential area piston connected to said valve member having its small area end in direct communication wtih said source at all times; a second valve assembly including a second orifice in communication with said source in parallel with asid first valve assembly, a second valve member for controlling the flow through said second orifice and a second differential area piston connected to said second valve member and having its small area end in direct communication with said source at all times, said fluid under pressure acting against said small area ends to effect closing movement of one of said valve members and opening movement of the other of said valve members; a controlled pressure chamber in communication with said source and a servo valve movable to vary the pressure level in said chamber, and means connecting the large area ends of said pistons with said chamber, the relative areas of the large area ends of said pistons with respect to each other and their corresponding small area ends being such that both said valve members are held closed when said servo valve is in its null position, and when said servo valve is moved in a direction to increase the pressure in said chamber above a threshhold value, said one of the pistons is caused to withdraw its corresponding valve member from its orifice in response to the fluid pressure acting against the large area end overcoming the fluid pressure acting against the small area end of said one of the pistons, and said other piston holds its valve member against its seat in response to the fluid pressure acting against the large area end overcoming the fluid pressure acting against the small area end of said other piston, and when said servo valve is moved in a direction to decrease the pressure in said chamber below a threshhold value to thereby reverse the fluid pressure differentials acting against said pistons and cause said other of the pistons to withdraw its corresponding valve member from its orifice and said one piston to hold its valve member against its seat.

2. A servo system as set forth in claim 1 wherein said servo valve is a torque motor having a pair of opposing orifices and a flapper valve movable between said orifices, one of said orifices being in communication wtih said source and the other being in communication with a low pressure source.

3. A servo system as set forth in claim 2, wherein electrical circuit means are provided to supply control signals to said torque motor and electrical feedback means are operatively connected to said pistons to supply position feedback signals to said circuit means.

4. In a servo system the combination comprising a source of fluid under pressure, a low fluid pressure source, a first conduit connecting said source of fluid under pressure with said low fluid pressure source, a control valve in said conduit and electric motor means for controlling the position of said valve, a control chamber adjacent said valve wherein, in the absence of a signal to said electric motor means, the pressure of said fluid is controlled to a desired value, a first cylinder communicating with said control chamber, a second cylinder communicating with said control chamber, a first valve for controlling the flow of said fluid from said pressure source to a point of use, a first piston in said first cylinder connected to said first valve and responsive to the fluid pressure in said control chamber such that decreases in the controlled pressure in said cylinder below a first threshhold value lower than said desired value causes said first valve to be opened in response to said decrease in said controlled pressure acting against said first piston and pressure above said first threshhold value causes said valve to be held closed in response to said increase in said controlled fluid pressure acting against said first piston, a second valve in parallel with said first valve for controlling the flow of said fluid, a second piston in said second cylinder connected to said second valve and responsive to the fluid pressure in said control chamber such that increases in the controlled pressure in said second cylinder above a second threshhold value higher than said desired value causes said second valve to be opened in response to said increase in said controlled pressure acting against said second piston, and pressures below said second threshhold value cause said valve to be held closed in response to a decrease in said pressure below said second threshold value acting against said second piston.

5. A servo system as set forth in claim 4 wherein electrical circuit means are provided to supply control signals to said electric motor means and electrical feedback means are operatively connected to said pistons to supply position feedback signals to said circuit means.

6. In a servo system the combination comprising a source of fluid under pressure, a first valve assembly and a second valve assembly both of which are in parallel communication with said source and each of which includes a valve member for controlling the flow through its corresponding orifice, and a differential area piston connected to each of said valve members, a controlled pressure chamber in communication with said source and a servo valve movable to vary the pressure level in said chamber, means connecting said controlled pressure chamber and said source to opposing sides of said pistons such that said pistons are responsive to the pressure differential between the chamber and the source, the relative areas of the ends of said pistons being such that both said valve members are held closed when said servo valve is in its null position, and when said servo valve is moved in a direction to increase the pressure in said chamber above a threshold value, one of said pistons is caused to withdraw its corresponding valve member from its orifice in response to the increase in said pressure differential and the other piston holds its valve member against its seat in response to the increase in said pressure differential, and when said servo valve is moved in a direction to decrease the pressure in said chamber below a second, lower threshold value, the other of said pistons is caused to withdraw its corresponding valve member from its orifice in response to the decrease in said pressure differential and said one piston holds its valve member against its seat in response to the decrease in said pressure differential.

7. A servo system as set forth in claim 6 wherein said servo valve is a torque motor having a pair of opposing orifices and a flapper valve movable between said orifices, one of said orifices being in communication with said source and the other being in communication with a low pressure source.

8. A servo system as set forth in claim 7 wherein electrical circuit means are provided to supply control signals to said torque motor and electrical feedback means are operatively connected to said pistons to supply position feedback signals to said circuit means.

9. For use with a thrust vector control including a rocket nozzle, first and second injection orifices oppositely disposed in the sidewall of said rocket nozzle and a source of fluid under pressure, said first and second injection orifices arranged to inject said pressurized fluid into said nozzle transversely to the longitudinal axis of said nozzle to thereby effect a corresponding variation in the nozzle thrust vector, the combination of a first injector unit connected to said source associated with said first orifice comprising a valve member for controlling the flow through said first orifice, a cylinder and a differential area piston reciprocable in said cylinder, a conduit communicating the small area end of said piston with said source, a torque motor including a pair of opposing orifices and flapper valve member movable between said orifice, a conduit communicating one of said orifices with said source, another conduit connecting said other orifice with a low pressure source having a check valve therein, a control pressure chamber disposed between said orifices having a fluid presure level variable between the pressure at said source of fluid under pressure and the pressure of said low pressure source, means communicating the large diameter end of said piston with said control pressure chamber; a second injector unit connected to said source associated with said second orifice comprising a valve member for controlling the flow through said second orifice, a cylinder and a second differential area piston reciprocable in said cylinder, a conduit communicating the small area end of said piston with said source of fluid under pressure, and a conduit connecting the large diameter end of said second piston with said control pressure chamber, the relative areas of the large area ends of said pistons with respect to each other and their corresponding small area ends being such that both said valve members are held closed when said flapper valve member is in its null position, and when said flapper valve is moved closer to said one orifice and the control pressure level is reduced below a first threshold value, one of said valves is caused to open and when said flapper valve is moved closer to said other orifice, and the control pressure is increased above a second, higher threshold value, said one valve is closed and the other of said valve is caused to be opened.

10. For use with a thrust vector control including a rocket nozzle, first and second injection orifices oppositely disposed in the sidewall of said rocket nozzle and a source of fluid under pressure, said first and second injection orifices arranged to inject said pressurized fluid into said nozzle transversely to the longitudinal axis of said nozzle to thereby effect a corresponding variation in the nozzle thrust vector, the combination of a first injector unit connected to said source including a valve for controlling the flow through said first orifice and a differential area piston connected to said valve with the small area end of said piston in communication with said source, a second injector unit connected to said source including a second valve for controlling the flow through said second orifice and a second differential area piston connected to said second orifice with the small end of said piston in communication with said source, a controlled pressure chamber and a torque motor including a pair of orifices and a flapper valve movable therebetween to vary the pressure in said chamber, and means connecting the large area ends of said pistons with said chamber, the relative areas of the large area ends of said pistons with respect to each other and their corresponding small area ends being such that both said valve members are held closed when said flapper valve member is in its null position, and when said flapper valve is moved closer to said one orifice and the control pressure level is reduced below a first threshold value, one of said valves is caused to open and when said flapper valve is moved closer to said other orifice, and the control pressure is increased above a second, higher threshold value, said one valve is closed and the other of said valves is caused to be opened.

11. For use with a thrust vector control including a rocket nozzle, first and second injection orifices oppositely disposed in the sidewall of said rocket nozzle and a source of fluid under pressure, said first and second injection orifices arranged to inject said pressurized fluid into said nozzle transversely to the longitudinal axis of said nozzle to thereby effect a corresponding variation in the nozzle thrust vector, the combination of a first injector unit connected to said source including a valve for controlling the flow through said first orifice and a differential area piston connected to said valve with the small area end of said piston in communication with said source, a second injector unit connected to said source including a second valve for controlling the flow through said second orifice and a second differential area piston connected to said second valve with the small area end of said piston in communication with said source, a control pressure chamber and a servo valve movable to vary the pressure in said chamber, and means connecting the large area ends of said pistons with said chamber, the relative areas of the large area ends of said pistons with respect to each other and their corresponding small area ends being such that both said valve members are held closed when said servo valve is in its null position, and when said servo valve is moved to increase the control pressure above the null pressure level one of said valves is caused to open and when said servo valve is moved to decrease the control pressure level below the null pressure level said one valve is opened and the other of said valves is caused to be closed.

References Cited in the file of this patent

UNITED STATES PATENTS

| | | |
|---|---|---|
| 143,819 | Gilbert | Oct. 21, 1873 |
| 2,414,451 | Christensen | Jan. 21, 1947 |
| 2,775,254 | Stanbury | Dec. 25, 1956 |
| 2,832,318 | Paine | Apr. 29, 1958 |
| 2,943,821 | Wetherbee | July 5, 1960 |
| 2,953,123 | Reen et al. | Sept. 20, 1960 |
| 2,972,338 | Lloyd | Feb. 21, 1961 |
| 2,974,594 | Boehm | Mar. 14, 1961 |

FOREIGN PATENTS

| | | |
|---|---|---|
| 1,130,132 | France | Sept. 17, 1956 |

OTHER REFERENCES

Sung et al.: "Reaction Controllers Maintain Attitude of Space Vehicles," Control Engineering Magazine, vol. 7, No. 1, page 151, January 1960.

Notice of Adverse Decision in Interferences

In Interference No. 96,206 involving Patent No. 3,128,602, R. M. Salemka, THRUST VECTOR CONTROL, final judgment adverse to the patentee was rendered July 18, 1969, as to claim 4.

[*Official Gazette October 28, 1969.*]